US007657793B2

(12) United States Patent
Avritzer

(10) Patent No.: US 7,657,793 B2
(45) Date of Patent: *Feb. 2, 2010

(54) ACCELERATING SOFTWARE REJUVENATION BY COMMUNICATING REJUVENATION EVENTS

(75) Inventor: Alberto Avritzer, Mountainside, NJ (US)

(73) Assignee: Siemens Corporation, Iselin, NJ (US)

( * ) Notice: Subject to any disclaimer, the term of this patent is extended or adjusted under 35 U.S.C. 154(b) by 403 days.

This patent is subject to a terminal disclaimer.

(21) Appl. No.: 11/680,670

(22) Filed: Mar. 1, 2007

(65) Prior Publication Data

US 2007/0250739 A1 Oct. 25, 2007

Related U.S. Application Data

(60) Provisional application No. 60/793,759, filed on Apr. 21, 2006.

(51) Int. Cl.
*G06F 11/00* (2006.01)
(52) U.S. Cl. .............................. 714/38; 714/47; 714/48
(58) Field of Classification Search .................. 714/38, 714/47, 48
See application file for complete search history.

(56) References Cited

U.S. PATENT DOCUMENTS

| 5,715,386 | A * | 2/1998 | Fulton et al. .................. 714/38 |
|---|---|---|---|
| 6,216,237 | B1 | 4/2001 | Klemm et al. |
| 6,594,784 | B1 | 7/2003 | Harper et al. |
| 6,629,266 | B1 | 9/2003 | Harper et al. |
| 6,810,495 | B2 | 10/2004 | Castelli et al. |
| 6,970,697 | B2 | 11/2005 | Kouznetsov et al. |
| 6,971,019 | B1 | 11/2005 | Nachenberg |
| 6,993,458 | B1 * | 1/2006 | Castelli et al. .............. 702/186 |
| 7,454,661 | B2 * | 11/2008 | Yu ................................ 714/38 |
| 7,475,292 | B2 * | 1/2009 | Avritzer et al. ................ 714/47 |
| 7,484,128 | B2 * | 1/2009 | Bondi et al. .................. 714/38 |
| 2002/0087612 | A1 | 7/2002 | Harper et al. |
| 2002/0087913 | A1 | 7/2002 | Harper et al. |
| 2002/0144178 | A1 | 10/2002 | Castelli et al. |
| 2003/0023719 | A1 | 1/2003 | Castelli et al. |
| 2003/0036882 | A1 | 2/2003 | Harper et al. |
| 2003/0037288 | A1 | 2/2003 | Harper et al. |
| 2003/0079154 | A1 | 4/2003 | Park et al. |
| 2004/0078657 | A1 * | 4/2004 | Gross et al. ................... 714/15 |
| 2004/0088580 | A1 | 5/2004 | Cabrera et al. |
| 2004/0213361 | A1 | 10/2004 | Chen et al. |
| 2006/0048017 | A1 * | 3/2006 | Anerousis et al. ............. 714/47 |
| 2006/0117223 | A1 * | 6/2006 | Avritzer et al. ................ 714/38 |
| 2006/0130044 | A1 * | 6/2006 | Avritzer et al. .............. 717/168 |

OTHER PUBLICATIONS

Williamson, Matthew M., "Throttling Viruses: Restricting propagation to defeat malicious mobile code," preprint, 2003.

(Continued)

*Primary Examiner*—Emerson C Puente

(57) ABSTRACT

A computer readable medium is provided embodying instructions executable by a processor to perform a method for triggering a software rejuvenation system or method, the method includes receiving a request for resources at a node, determining an estimated response time to the request for resources, determining that the estimated response time is greater than a first threshold, and triggering the software rejuvenation system or method at the node, the triggering including broadcasting an alert upon determining one of, a number of estimated response times is greater than the first threshold is greater than or equal to a dynamic second threshold, and a prior alert is received from another node.

17 Claims, 5 Drawing Sheets

OTHER PUBLICATIONS

Garg, Sachin et al., "Analysis of Software Rejuvenation using Markov Regenerative Stochastic Petri Net," ISSRE95, Oct. 1995.

Zou, Cliff Changchun, et al., "Code Red Worm Propagation Modeling and Analysis," CCS (2002) ACM.

Bobbio, A, et al., "Fine Grained Software Degradation Models for Optimal Rejuvenation Policies," *Performance Evaluation*, vol. 46, pp. 45-62 (2001).

Trivedi, Kishor S., et al, "Modeling and Analysis of Software Aging and Rejuvenation," *IEEE Annual Simulation Symposium*, Apr. 2000.

Pfening Andras, et al., "Optimal Software Rejuvenation for Tolerating Soft Failures," *Performance Evaluation*, vol. 27 & 23 Oct. 1996.

Castelli, V. et al., "Proactive Management of Software Aging," *IBM Journal of Research and Development*, vol. 46, No. 2, pp. 311-332, Mar. 2001.

Dohi, Tadashi, et al., "Statistical Non-Parametric Algorithms to Estimate the Optimal Software Rejuvenation Schedule" *Pacific Rim International Symp. On Dependable Computing*, PRDC 2000, Dec. 2000.

\* cited by examiner

ACCELERATING SOFTWARE REJUVENATION BY COMMUNICATING REJUVENATION EVENTS

CROSS-REFERENCE TO RELATED APPLICATION

This application claims priority to U.S. Provisional Application Ser. No. 60/793,759, filed on Apr. 21, 2006, which is herein incorporated by reference in its entirety.

BACKGROUND OF THE INVENTION

1. Technical Field

The present invention relates to software rejuvenation, and more particularly to a system and method for accelerating software rejuvenation by communicating rejuvenation events.

2. Discussion of Related Art

Large industrial software systems require extensive monitoring and management to deliver expected performance and reliability. Some specific types of software failures, called soft failures, have been shown to leave the system in a degraded mode, where the system is still operational, but the available system capacity has been greatly reduced. Examples of soft bugs have been documented in several software studies. Soft failures can be caused by the evolution of the state of one or more software data structures during (possibly) prolonged execution. This evolution is called software aging. Software aging has been observed in widely used software. An approach for system capacity restoration for telecommunications systems has been developed that takes advantage of the cyclical nature of telecommunications traffic was proposed. Telecommunications operating companies understand the traffic patterns in their networks well, and therefore can plan to restore their smoothly degrading systems to full capacity in the same way they plan their other maintenance activities. Experience has been that soft bugs occur as a result of problems with synchronization mechanisms, e.g., semaphores; kernel structures, e.g. file table allocations; database management systems, e.g. database lock deadlocks; and other resource allocation mechanisms that are essential to the proper operation of large multi-layer distributed systems. Since some of these resources are designed with self-healing mechanisms, e.g. timeouts, some systems may recover from soft bugs after a period of time. For example, for a specific Java based e-commerce system, when the soft bug was revealed, users were complaining of very slow response time for periods exceeding one hour, after which the problem would clear by itself. Host based worm disruption system that throttles the rate of connections out of a host has been reported. An approach for virus detection based on the inspection of the binary representing the process and the execution of a pattern-matching algorithm against known virus signature has been reported.

When an e-commerce system is a victim of a worm attack, software rejuvenation must be quickly triggered to avoid extensive infection of the e-commerce server and its network neighborhood. Therefore, a need exists for a system and method for accelerating software rejuvenation by communicating rejuvenation events.

SUMMARY OF THE INVENTION

According to an embodiment of the present disclosure a computer readable medium is provided embodying instructions executable by a processor to perform a method for triggering a software rejuvenation system or method, the method includes receiving a request for resources at a node, determining an estimated response time to the request for resources, determining that the estimated response time is greater than a first threshold, and triggering the software rejuvenation system or method at the node, the triggering including broadcasting an alert upon determining one of, a number of estimated response times is greater than the first threshold is greater than or equal to a dynamic second threshold, and a prior alert is received from another node.

According to an embodiment of the present disclosure, a computer readable medium is provided embodying instructions executable by a processor to perform a method for triggering a software rejuvenation system or method, the method including receiving a request for resources at a node, determining a response time to the request for resources, increasing a number of response times greater than a first threshold upon determining that the response time is greater than the first threshold, decreasing the number of response times greater than the first threshold upon determining that the response time is less than the first threshold, and triggering the software rejuvenation system or method at the node upon determining one of, the number of response times greater than the first threshold is greater than or equal to a dynamic second threshold, and a prior alert is received from another node.

According to an embodiment of the present disclosure, a computer readable medium is provided embodying instructions executable by a processor to perform a method for distinguishing between a burst of requests and a decrease in performance of a software product, the method comprising including receiving a plurality of requests for resources, comparing each of the plurality of requests to a first variable threshold, varying the first variable threshold to distinguish between a burst of requests and a decrease in performance of a software product for handling the plurality of requests, varying a second variable threshold upon varying the first variable threshold, and triggering a software rejuvenation system or method upon determining one of, a number of response times greater than the variable threshold at a predetermined highest level is greater than or equal to the second variable threshold, and a prior alert is received from another node.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Figure 1:
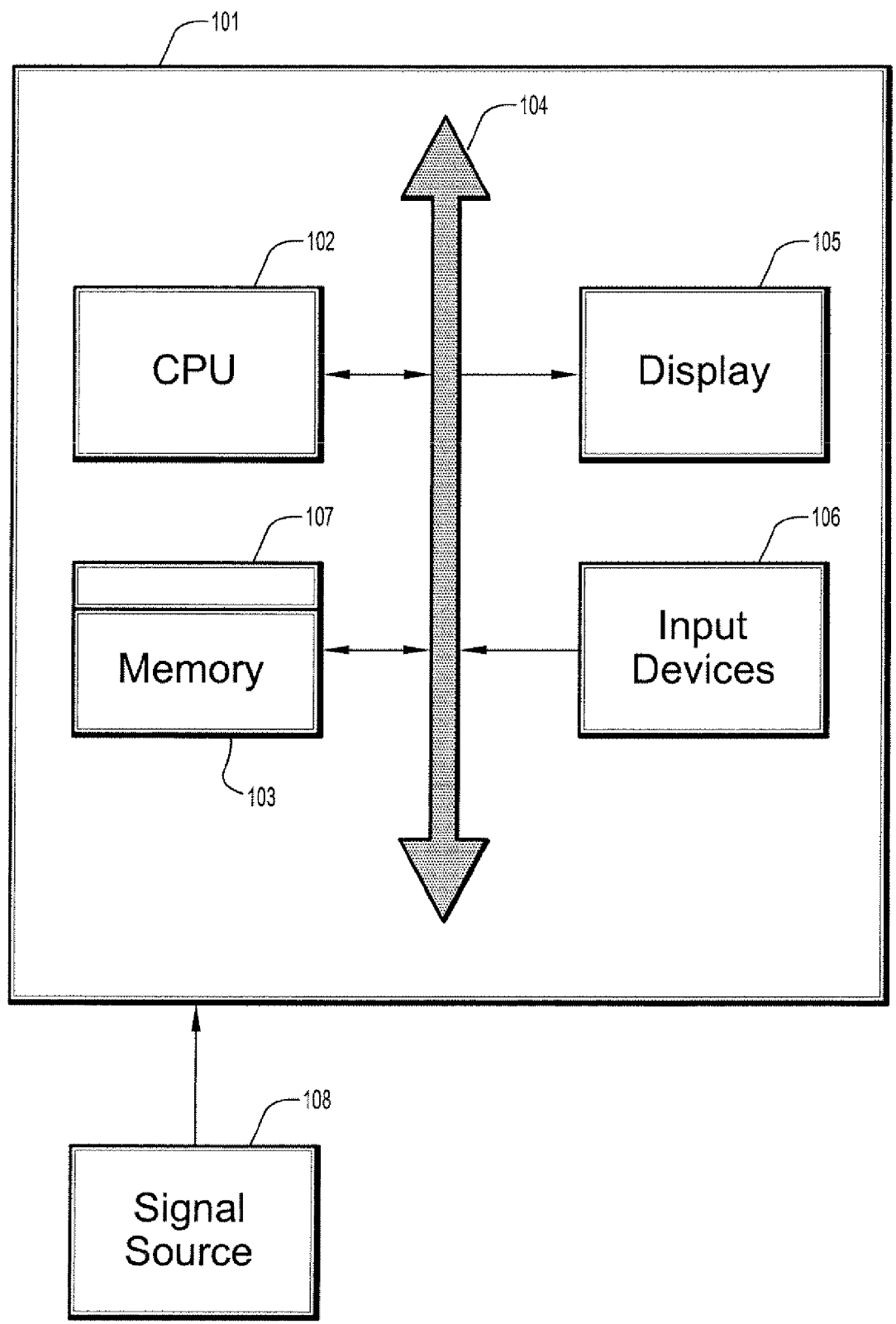
FIG. 1 is a diagram of a system according to an embodiment of the present disclosure.

The software rejuvenation event is a pre-emptive restart of a running application or system to prevent future failures. The restart may terminate all threads in execution and release all resources associated with the threads. The software rejuvenation event may include additional activities, such as a backup routine or garbage collection.

According to an embodiment of the present disclosure, a system and method accelerates software rejuvenation of all nodes in the network by communicating rejuvenation events whenever a host is rejuvenated. A software rejuvenation method ensures that the overall network rate of software rejuvenation is greater than the overall rate of network infection. If the rate of host worm infection is larger than the rate of software restoration the worm epidemic will propagate very quickly. Therefore, whenever a host is rejuvenated, it will broadcast a notice of the rejuvenation event to all nodes in the network. Hosts nodes will reduce their bucket depths when the notice of a rejuvenation event is received, therefore accelerating the overall rate of network node restoration.

The system and method specify a performance signature of applications that are allowed to run at the host. In addition, the system and method use the communication of software rejuvenation event to quickly disrupt worm propagation. Software rejuvenation may be used to ensure good performance when faced with soft faults. Here, by using performance signatures and software rejuvenation worm infections may be quickly detected. In addition, because the system and method use multiple buckets to count the variability in the measured customer affecting metric, a degradation that is a function of a transient in the arrival process may be distinguished from degradation that is a function of worm infection.

According to an embodiment of the present disclosure, a system and method are designed to distinguish between performance degradation due to a burst of arrivals and performance degradation due to increased service time as a result of system capacity degradation. If a system is operating at full capacity and a short burst of arrivals is presented, there should be no benefit in executing the preventive maintenance routine. However, if system capacity has been degraded to such an extent that users are effectively locked out of the system, preventive maintenance may be warranted.

The customer affecting metric of performance can be sampled frequently and the first and second moments of the metric when the system is operating at full capacity can be estimated before the monitoring tool is deployed in production.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Referring to FIG. 1, according to an embodiment of the present invention, a computer system 101 for implementing a method for accelerating software rejuvenation by communicating rejuvenation events comprises, inter alia, a central processing unit (CPU) 102, a memory 103 and an input/output (I/O) interface 104. The computer system 101 is generally coupled through the I/O interface 104 to a display 105 and various input devices 106 such as a mouse and keyboard. The support circuits can include circuits such as cache, power supplies, clock circuits, and a communications bus. The memory 103 can include random access memory (RAM), read only memory (ROM), disk drive, tape drive, etc., or a combination thereof. The present invention can be implemented as a routine 107 that is stored in memory 103 and executed by the CPU 102 to process the signal from the signal source 108. As such, the computer system 101 is a general-purpose computer system that becomes a specific purpose computer system when executing the routine 107 of the present invention.

The computer platform 101 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
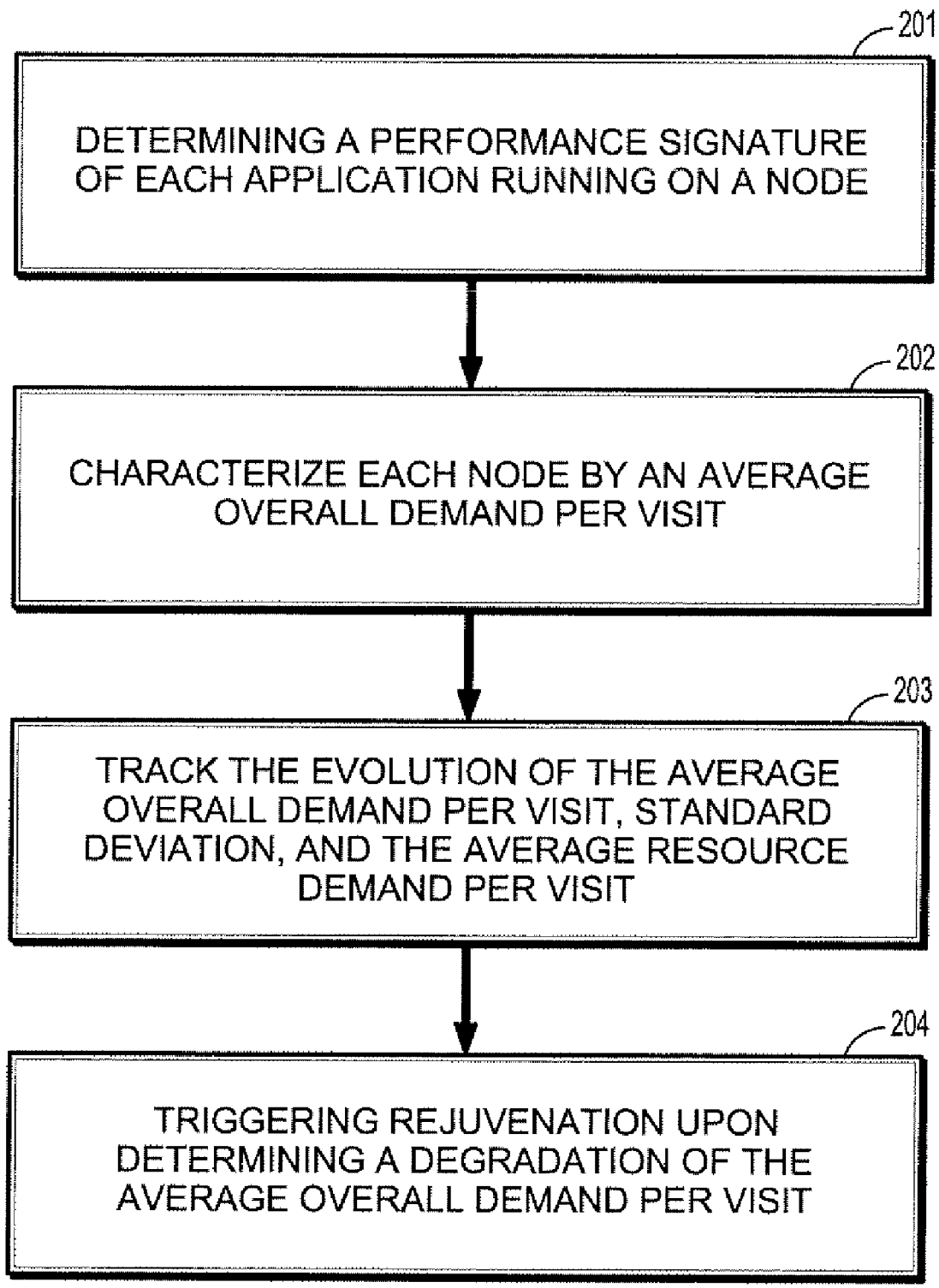
FIG. 2 is a flow chart of a method according to an embodiment of the present disclosure.

Referring to FIG. 2:

At block 201, each node runs a suite of applications. Each application x has a specified average CPU resource demand per visit $\mu'\_ix$ and standard deviation $\sigma'\_ix$, on Node i. This set represents the performance signature of the applications allowed to be executed at the host. At block 202, Node i is characterized by an average overall demand per visit $S_i = \Sigma (p\_ix * \mu\_ix)$, where p_ix is the probability of occurrence of application x on Node I, and $\sigma\_i$ is derived as $\sqrt{(\Sigma \sigma\_ix^2)}$. At block 203, the rejuvenation method tracks the evolution of $S_i$, $\sigma\_i$ in each node, as well $\mu\_ix$. At block 204, the rejuvenation method triggers rejuvenation when a significant degradation is detected on $S_i$.

Once a system is rejuvenated, it applies the Central Limit Theorem to detect if the Normal distribution of application x has shifted. In this case it would block the rejuvenation of application x.

Figure 3:
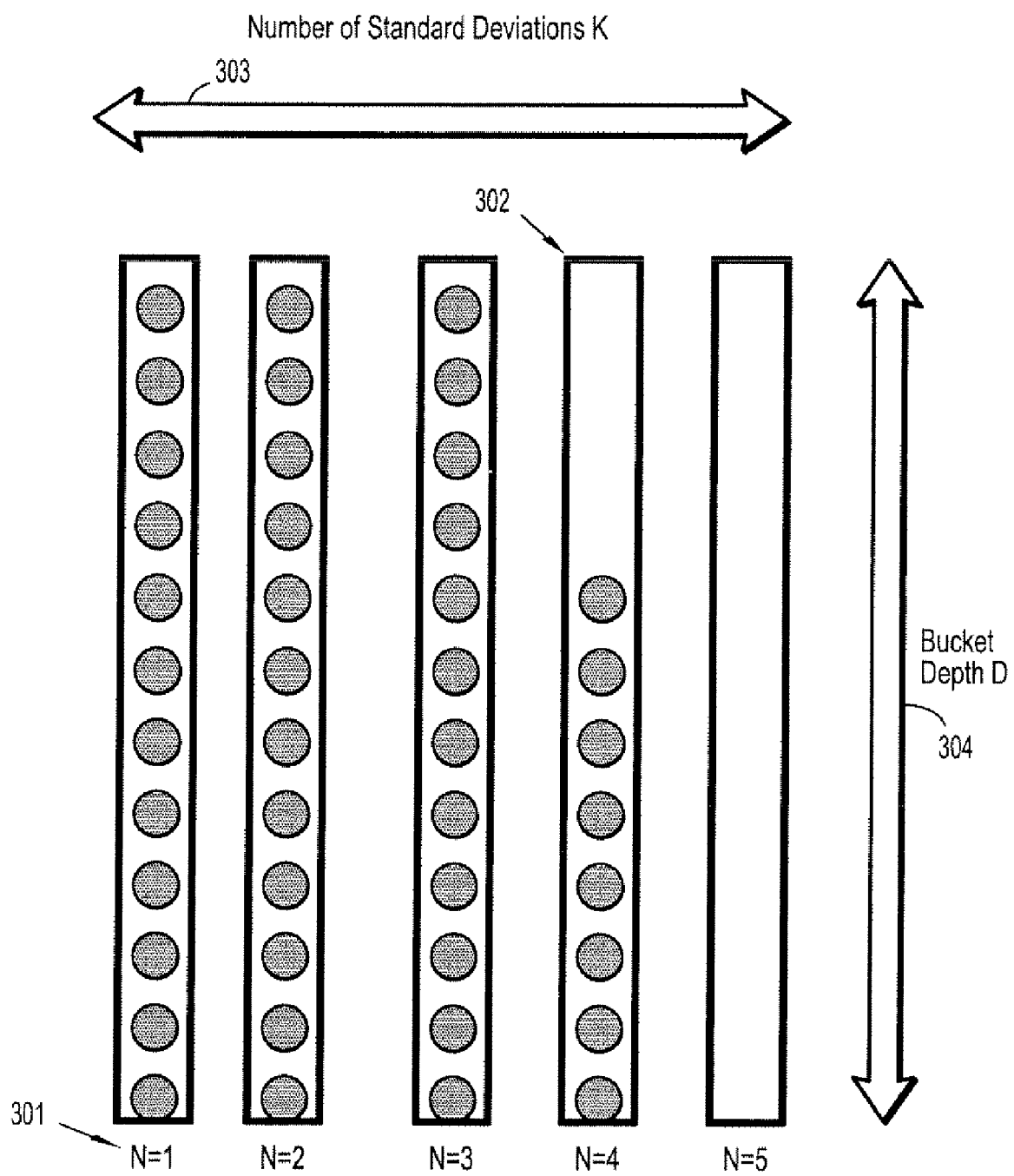
FIG. 3 is an illustration of a method according to an embodiment of the present disclosure.

Referring to FIG. 3, N represents a bucket index 301; in the example shown in FIG. 3 N=4. d represents the number of balls stored in the current bucket 302; in the example 8 balls are currently in bucket 4. The K contiguous buckets 303 are modeled, tracking the number of balls in each bucket.

The monitoring system architect or administrator can tune a method's resilience to a burst of arrivals (e.g., transaction requests) by changing the value of D 304. The method's resilience to degradation in the customer affecting metric is adjusted by tuning the value of K. K represents the number of standard deviations from the mean that would be tolerated before the software rejuvenation routine is activated.

It should be noted that throughout the specification, embodiments have been described using the terms "bucket" and "ball". These terms are analogous to any method for counting the occurrence of an event, for example, in computer science consider an element of an array as a bucket, wherein the array is K elements (e.g., buckets) long and each element stores a number representing a number of times an event has occurred (e.g., balls). One of ordinary skill in the art would appreciate that other methods of tracking a customer-affecting metric are possible.

According to an embodiment of the present disclosure, a method may be used to monitor the relevant customer affecting metrics in our products and to trigger software rejuvenation whence the estimate of the customer affecting metric exceeds a specified target.

By dynamically tuning the value of $D_N$ for each bucket N a dynamic method is easier to administer and provides a performance level that is automatically matched to the instantaneous departure process. The dynamic tuning of bucket depths allows for management of system performance both at high loads and at low loads. In addition, because the dynamic method uses multiple buckets, with dynamically tuned depths, to count the variability in the measured customer affecting metric, the method can distinguish between degradation that is a function of a transient in the arrival process and degradation that is a function of software aging.

Whenever a transaction terminates processing, estimate the value of the customer affecting metric, $S_N$, by counting the recent number of occurrences d of sample values that are greater than $\bar{x}+N\sigma$, where $\bar{x}$ is the reference average expected value of the metric, N (=0, 1, 2, ..., K) is the index to the current bucket, and $\sigma$ is the reference expected standard deviation of the customer-affecting metric. K represents the total number of buckets used for the algorithm. $D_N$ represents the depth of bucket N. If the last available bucket overflows, the rejuvenation routine is executed. The algorithm works by tracking the levels of K contiguous buckets. At any given time, the level d of only the Nth bucket is considered. N is incremented when the current bucket overflows, i.e., when d first exceeds $D_N$, and is decremented when the current bucket is emptied, i.e., when d next takes the value zero. Whenever the Nth bucket overflows, the depth $D_{N+1}$ of the next bucket will be computed as $D_{N+1}=D_{MAX}/(S_N-(\bar{x}+N\sigma))$. $D_{MAX}$ is the maximum depth configured for the first bucket.

Figure 4:
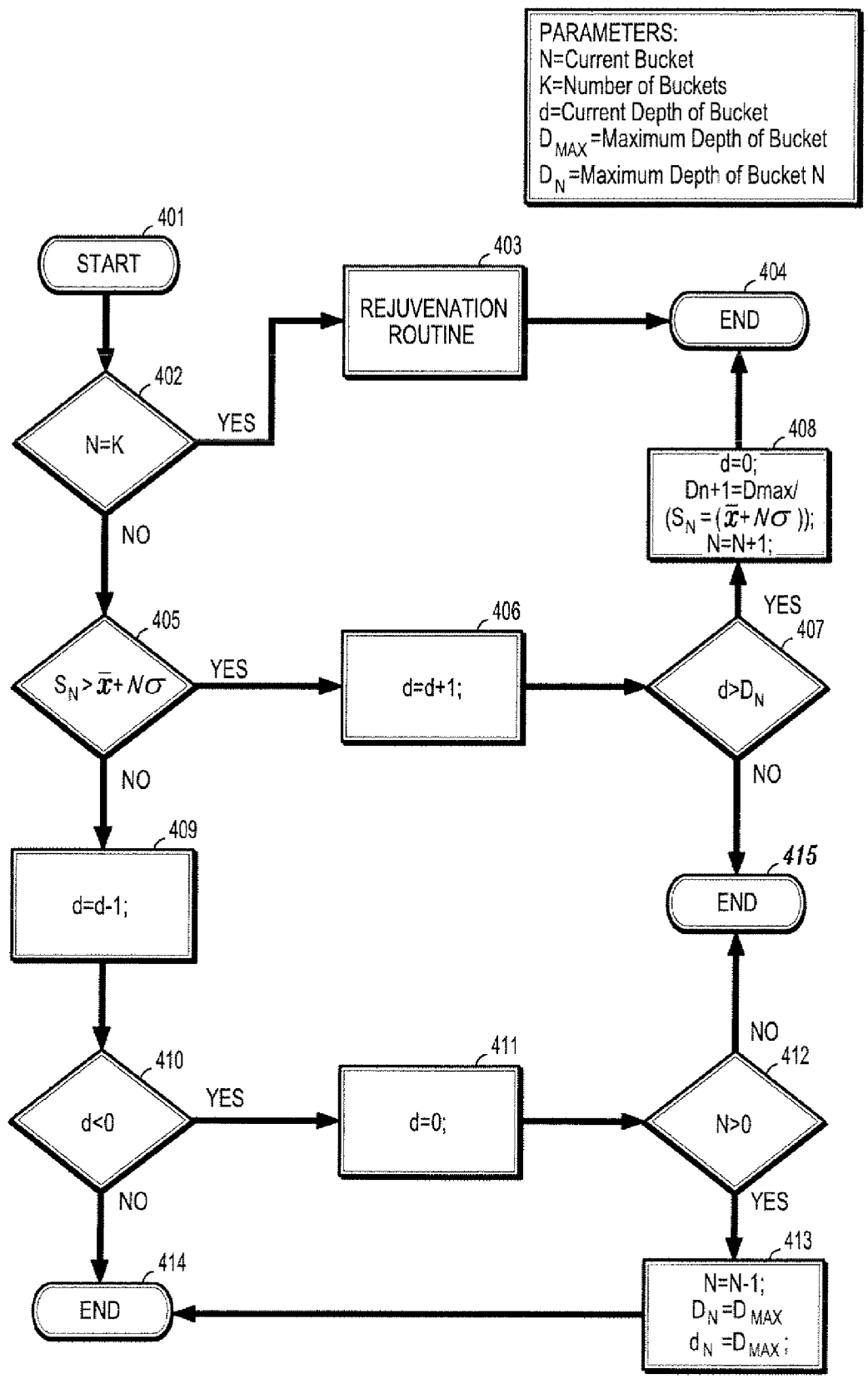
FIG. 4 is a flow chart of a method according to an embodiment of the present disclosure.

Referring to FIG. 4, a method for dynamic software rejuvenation can be written as:

```
if (N == K ) 402
    then
        execute rejuvenation routine 403 and {END} 404
    elseif (S_N > x̄+Nσ ) 405
        then
            do { d := d + 1;} 406
            if (d >D_N) 407
                then
                    do { d:=0; D_{N+1} = D_MAX/ (S_N − (x̄+Nσ)); N :=
                        N+1;} 408 and {END} 404
                    else
                        do {END}415
            else
                do { d := d − 1; } 409
                if (d < 0) 410
                    then
                        do {d := 0;} 411
                        if (N > 0) 412
                            then
                                do {d := D_MAX; N := N−1; D_N = D_MAX;} 413
                                and {END} 414
                            else
                                do {END} 415
                    else
                        do {END} 415
```

The dynamic method is initialized at system startup and at rejuvenation with d=0, N=0, $D_1=D_{MAX}$. The method works by modeling K contiguous buckets. A ball is dropped into the current bucket if the measured delay exceeds the expected value of the customer affecting metric A ball is removed from the current bucket if the measured delay is smaller than the expected value of the customer affecting metric.

When the current bucket overflows, a depth of the next bucket is dynamically determined. In addition, an estimation of the expected delay is determined by adding one standard deviation to the expected value of the metric. This is equivalent to moving to the next bucket. If a bucket underflows the one standard deviation is subtracted from the estimation of the expected delay. This is equivalent to moving down to the previous bucket. N represents the current bucket index. d represents the number of balls stored in the current bucket. Thus, a method according to an embodiment of the present disclosure reacts quickly to significant performance degradation by dynamically determining the value of $D_N$. A method according to an embodiment of the present disclosure is resilience to degradation in the customer affecting metric is adjusted by tuning the value of K. K represents the number of standard deviations from the mean that would be tolerated before the software rejuvenation routine is activated.

A dynamic tuning method according to an embodiment of the present disclosure delivers desirable baseline performance at low loads because it is only activated when the customer affecting metric exceeds the target. This performance is achieved by using multiple contiguous buckets to track bursts in the arrival process and a variable depth bucket to validate the moments where the estimate of the performance metric should be changed. A dynamic tuning method delivers superior performance at high loads because it quickly adjusts the current bucket depth when it detects a slowdown of the departure process.

The possibility that the departure rate will decrease non-linearly with $D_{MAX}$ is allowed for by using a generic function $F_N(D_{MAX})$ to estimated $D_{N+1}$ as the system degrades and making the bucket depth relationship to $D_{MAX}$ a function of $F_N$. Then, $D_{N+1}$ would be determined as $F_N(D_{MAX})$ as described above.

At very high loads, the rejuvenation feature can be targeted to rejuvenate only the components that are closer to a source of offending transactions. In a large distributed system this feature could be used to disrupt a denial of service attack, therefore protecting critical network resources. For example, a monitoring tool can track the source of each request causing the triggering of the software rejuvenation system or method, and target the software rejuvenation system or method to a source of a predetermined number of the requests, for example, 40% of the requests causing the triggering of the software rejuvenation system or method.

According to an embodiment of the present disclosure, a dynamic method for software rejuvenation can monitor the relevant customer affecting metrics in products and trigger software rejuvenation whence the estimate of the customer affecting metric exceeds a specified target. The dynamic tuning feature of the software rejuvenation method can be used to complement overload control algorithms to protect against denial of service attacks, because it reacts very quickly to slowdowns of the departure process.

According to an embodiment of the present disclosure, using a monitoring infrastructure a series of sample values are collected for each application's customer affecting metric and $S_i$ is determined, by taking the average of the series $S_i=\Sigma(p_{ix}*\mu_{ix})$, and counting the recent number of occurrences d of $S_i$, that are greater than $\bar{x}+N\sigma_i$, where $\bar{x}$ is the reference average expected value of the metric, N (=0, 1, 2, ..., K) is the index to the current bucket, and $\sigma_i$ is the reference expected standard deviation of the customer-affecting metric, for node i. K represents the total number of buckets used for the algorithm. $D_N$ represents the depth of bucket N. In addition, for each application track separately the evolution of $\mu_{ix}$ and compare with the specified target $\mu'_{ix}$. If the last available bucket overflows, the rejuvenation routine is executed. Identify the offending application by comparison, if $1/\mu_{ix}>1/\mu'_{ix}+1.96\sigma'_{ix}$, the method declares that the application response time distribution has shifted. The method works by tracking the levels of K contiguous buckets. At any given time, the level d of only the Nth bucket is considered. N is incremented when the current bucket overflows, i.e. when d first exceeds $D_N$, and is decremented when the current bucket is emptied, i.e., when d next takes the value zero. Whenever the Nth bucket overflows, the depth $D_{N+1}$ of the next bucket will be computed as $D_{N+1}=D_{MAX}/(S_{N-}(\bar{x}+N\sigma))$. $D_{MAX}$ is the maximum depth configured for the first bucket.

Referring again to FIG. 4, here the method includes blocking restoration for any application for which $1/\mu_{ix}>1/\mu'_x+1.96\sigma'_x$ at block 403. Further, block 407 is satisfied if $(d>D_N)$ or any host node in the network has issued a rejuvenation event.

According to an embodiment of the present disclosure, a MultipleWarning Worm Rejuvenation (MW-WR) method modifies the Dynamic Rejuvenation method described with reference to FIG. 4 by increasing the sensitivity of monitoring based upon rejuvenations occurring at peer hosts in the network. Specifically, block 403 is modified such that, if (N==K 402 then execute rejuvenation routine and send an alert to all neighbor nodes 403 and {END} 404. Further, block 407 is modified such that, if $(d>D_N)$ or an alert is received from a neighbor host 407 then do $\{d:=0; D_{N+1}=D_{MAX}/(S_N-(\bar{x}+N\sigma)); N:=N+1;\}$ 408 and {END} 404.

Besides monitoring response times and performing software rejuvenation, the MW-WRA sends alerts to neighbor hosts whenever a rejuvenation event has been triggered. This alerting increases the speed of software rejuvenation (i.e., decreases the time between rejuvenation events) of neighbors when a significant degradation in performance is detected in any host. In an exemplary implementation, within a wireless taps architecture, this information would be picked up through the periodic reports broadcast by the taps, which are network embedded agents that passively monitor the performance of applications running over the network.

According to an embodiment of the present disclosure, Single Warning Worm Rejuvenation (SW-WR) method is a modification of the MW-WRA, which decreases monitoring sensitivity based upon rejuvenations occurring at peer hosts in the network In SW-WR, a host acts only upon the receipt of the first warning message, and not whenever a message has been sent as was the case in MW-WM. Hence, the SW-WM modifies bock 407 such that, if $(d>D_N)$ or a first alert is received from a neighbor host 407 then do $\{d:=0; D_{N+1}=D_{MAX}/(S_N-(\bar{x}+N\sigma)); N:=N+1;\}$ 408 and {END} 404. The remainder of this method is the same as MW-WM.

Figure 5:
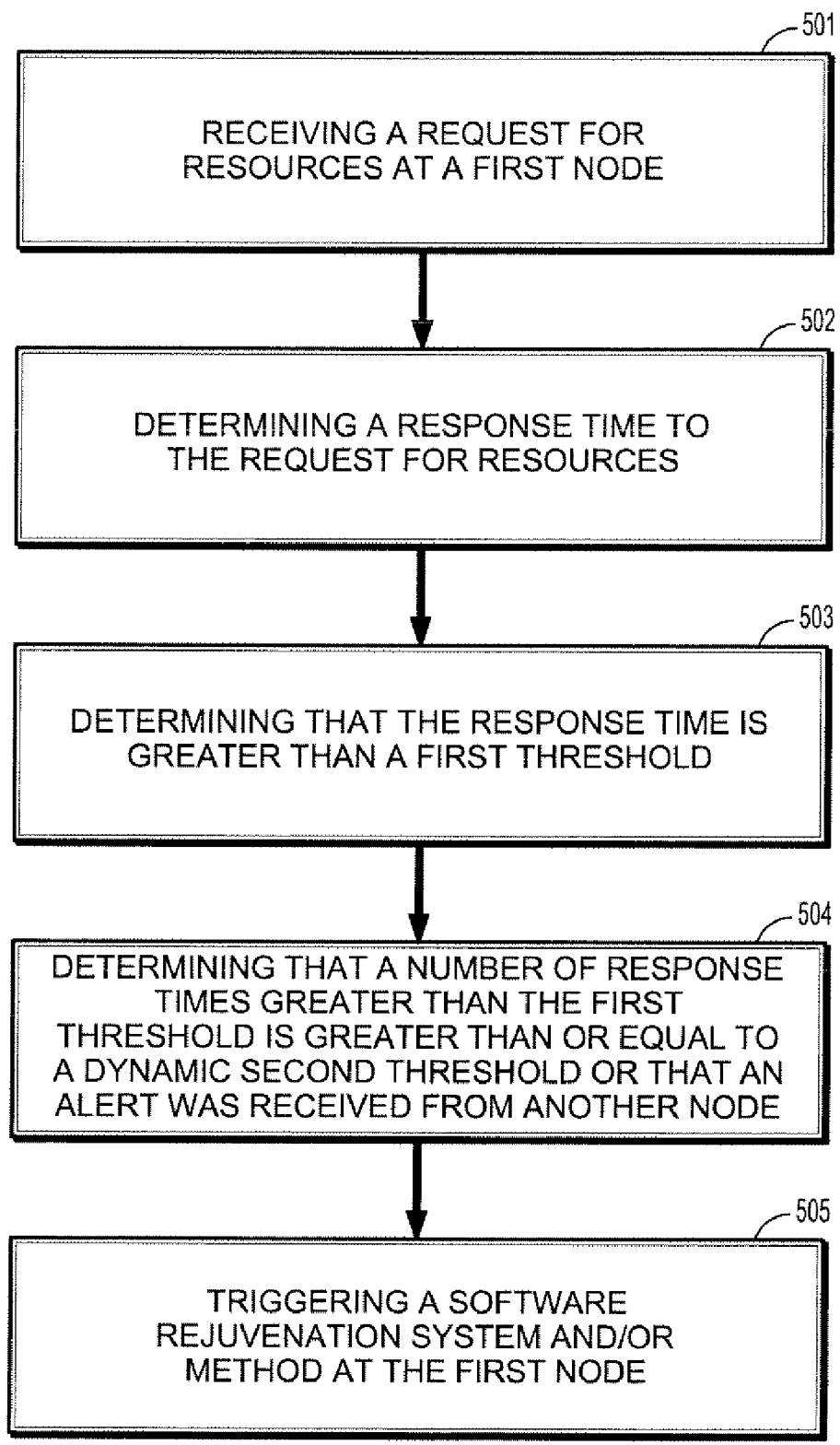
FIG. 5 is a flow chart of a method according to an embodiment of the present disclosure.

Referring to FIG. 5, according to an embodiment of the present disclosure, a tunable method for triggering a software rejuvenation system and/or method includes receiving a request for resources at a node 501, determining a response time to the request for resources 502, determining that the response time is greater than a first threshold 503, determining that a number of response times greater than the first threshold is greater than a dynamic second threshold or that an alert was received from another node 504, and triggering the software rejuvenation system and/or method at the node 505. The response time is an example of a customer-affecting metric, other metrics may be used, for example, a number of 504 errors received by a client (e.g., add a ball to a bucket upon receiving a 504 error and subtract a ball from the bucket upon receiving a valid response).

Having described embodiments for a system and method for accelerating software rejuvenation by communicating rejuvenation events, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A computer readable medium embodying instructions executable by a processor to perform a method for triggering a software rejuvenation system or method, the method comprising:
    receiving a request for resources at a node;
    determining an estimated response time to the request for resources;
    determining that the estimated response time is greater than a first threshold; and
    triggering the software rejuvenation system or method at the node, the triggering including broadcasting an alert upon determining one of,
    a number of estimated response times greater than the first threshold is greater than or equal to a dynamic second threshold, and
    a prior alert is received from another node.

2. The computer readable medium of claim 1, wherein the software rejuvenation is triggered by the prior alert only if the prior alert is a first alert.

3. The computer readable medium of claim 1, wherein determining the estimated response time comprises:
    sampling a plurality of response times; and
    determining an average response time, wherein the average response time is used as the estimated response time.

4. The computer readable medium of claim 1, wherein the first threshold varies according to a number of estimated response times greater than the first threshold, and the dynamic second threshold is determined each time the first threshold is varied.

5. The computer readable medium of claim 4, further comprising increasing the first threshold with the number of response times greater than the first threshold.

6. The computer readable medium of claim 1, wherein the dynamic second threshold is a positive integer.

7. A computer readable medium embodying instructions executable by a processor to perform a method for triggering a software rejuvenation system or method, the method comprising:
    receiving a request for resources at a node;
    determining a response time to the request for resources;
    increasing a number of response times greater than a first threshold upon determining that the response time is greater than the first threshold;
    decreasing the number of response times greater than the first threshold upon determining that the response time is less than the first threshold; and
    triggering the software rejuvenation system or method at the node upon determining one of,
    the number of response times greater than the first threshold is greater than or equal to a dynamic second threshold, and
    a prior alert is received from another node.

8. The computer readable medium of claim 7, wherein the software rejuvenation is triggered by the prior alert only if the prior alert is a first alert.

9. The computer readable medium of claim 7, further comprising:
    increasing the first threshold by a number of standard deviations upon determining the number of response times greater than the first threshold is greater than D, wherein the first threshold can be increased K standard deviations, and wherein K and D are the same or different positive integers, and the second threshold is K multiplied by D; and re-determining the dynamic second threshold upon increasing the first threshold.

10. The computer readable medium of claim 7, further comprising:

decreasing the first threshold by a number of standard deviations upon determining the number of response times greater than the first threshold is less than D, wherein the first threshold can be decreased K standard deviations, and wherein K and D are the same or different positive integers, and the second threshold is K multiplied by D; and re-determining the dynamic second threshold upon decreasing the first threshold.

11. The computer readable medium of claim 7, wherein the request for resources is generated by a client.

12. The computer readable medium of claim 7, wherein the request for resources is generated by a load injector.

13. The computer readable medium of claim 7, further comprising initializing with the number of response times greater than the first threshold at zero, the first threshold set at a lowest level, and the dynamic second threshold at a highest level.

14. A computer readable medium embodying instructions executable by a processor to perform a method for distinguishing between a burst of requests and a decrease in performance of a software product, the method comprising comprising:

receiving a plurality of requests for resources;

comparing each of the plurality of requests to a first variable threshold; varying the first variable threshold to distinguish between a burst of requests and a decrease in performance of a software product for handling the plurality of requests;

varying a second variable threshold upon varying the first variable threshold; and triggering a software rejuvenation system or method upon determining one of, a number of response times greater than the first variable threshold at a predetermined highest level is greater than or equal to the second variable threshold, and a prior alert is received from another node.

15. The computer readable medium of claim 14, wherein the software rejuvenation is triggered by the prior alert only if the prior alert is a first alert.

16. The computer readable medium of claim 14, further comprising:

determining a source of each request causing the software rejuvenation to be triggered; and determining a common source of a predetermined number of the requests causing the software rejuvenation to be triggered, wherein the software rejuvenation system or method is triggered at a computer node nearest to the common source from among a plurality of computer nodes.

17. The computer readable medium of claim 14, further comprising initializing with the number of response times greater than the first variable threshold at zero, the first variable threshold set at a lowest level, and the second variable threshold at a highest level.

* * * * *